(12) United States Patent
Lincoln et al.

(10) Patent No.: US 7,621,188 B2
(45) Date of Patent: Nov. 24, 2009

(54) FLOW METER

(75) Inventors: David Lincoln, Stonehouse (GB); Michael Armitage, Stonehouse (GB)

(73) Assignee: ABB Limited, Cheshire (GB)

( * ) Notice: Subject to any disclaimer, the term of this patent is extended or adjusted under 35 U.S.C. 154(b) by 0 days.

(21) Appl. No.: 11/840,609

(22) Filed: Aug. 17, 2007

(65) Prior Publication Data

US 2008/0060446 A1    Mar. 13, 2008

(30) Foreign Application Priority Data

Aug. 18, 2006  (GB)  ................................. 0616504.7

(51) Int. Cl.
*G01F 1/58* (2006.01)
(52) U.S. Cl. .................................................. 73/861.12
(58) Field of Classification Search .............. 73/861.08, 73/861.12
See application file for complete search history.

(56) References Cited

U.S. PATENT DOCUMENTS

| | | | |
|---|---|---|---|
| 3,309,924 A * | 3/1967 | Kolin et al. ............... | 73/861.12 |
| 3,449,951 A * | 6/1969 | Westerten ................ | 73/861.17 |
| 3,835,705 A | 9/1974 | Hadjidjanian | |
| 4,015,471 A * | 4/1977 | Marsh ..................... | 73/861.15 |
| 4,019,385 A | 4/1977 | Watanabe | |
| 4,388,834 A * | 6/1983 | Schmoock ............... | 73/861.12 |
| 4,420,983 A | 12/1983 | Langdon | |
| 4,430,901 A | 2/1984 | Rogers | |
| 4,614,121 A * | 9/1986 | Hansen et al. ........... | 73/861.12 |
| 4,741,215 A * | 5/1988 | Bohn et al. .............. | 73/861.12 |
| 4,899,593 A | 2/1990 | Inami et al. | |
| 4,920,795 A * | 5/1990 | Codazzi et al. ................ | 73/195 |
| 5,583,299 A | 12/1996 | Murase | |
| 5,646,353 A * | 7/1997 | Mesch et al. ............. | 73/861.16 |
| 5,708,213 A * | 1/1998 | Batey ....................... | 73/861.12 |
| 5,773,723 A | 6/1998 | Lewis et al. | |
| 5,852,247 A * | 12/1998 | Batey ....................... | 73/861.17 |
| 5,880,376 A * | 3/1999 | Sai et al. .................. | 73/861.08 |
| 6,237,424 B1* | 5/2001 | Salmasi et al. ........... | 73/861.17 |
| 7,117,749 B2* | 10/2006 | Turner ..................... | 73/861.12 |
| 7,213,467 B2* | 5/2007 | Turner et al. ............. | 73/861.12 |

(Continued)

FOREIGN PATENT DOCUMENTS

EP    0 638 785 A2    2/1995

(Continued)

OTHER PUBLICATIONS

Office Action dated May 11, 2009, for U.S. Appl. No. 11/840,697, filed Aug. 17, 2007.

*Primary Examiner*—Harshad Patel
(74) *Attorney, Agent, or Firm*—Alston & Bird, LLP (57) ABSTRACT

An electromagnetic flow meter for measuring flow rate of a fluid passing therethrough includes a conduit defining a fluid inlet, a fluid outlet and a measuring section positioned between the inlet and the outlet. The flow meter also includes a single coil for generating a magnetic field across the measuring section and electrodes for detecting induced electrical potential due to the fluid passage. The coil may be arranged to surround a section of the measuring section over a segment angle of between 140 and 180 degrees. The electrodes may be positioned so that they are offset from being opposite each other on the centerline of the measuring section, by an offset angle of between 5 degrees and 45 degrees.

50 Claims, 8 Drawing Sheets

U.S. PATENT DOCUMENTS

| | | | |
|---|---|---|---|
| 7,369,949 B2 * | 5/2008 | Yamamoto | 702/45 |
| 7,523,675 B2 | 4/2009 | Sulzer et al. | |
| 2004/0250629 A1 | 12/2004 | Turner et al. | |
| 2007/0220993 A1 * | 9/2007 | Yamamoto | 73/861.16 |
| 2007/0272030 A1 * | 11/2007 | Yamamoto | 73/861.12 |
| 2008/0028867 A1 * | 2/2008 | Yamamoto | 73/861.12 |

FOREIGN PATENT DOCUMENTS

| | | |
|---|---|---|
| GB | 2 328 021 A | 2/1999 |
| GB | 2 409 525 A | 6/2005 |
| GB | 2 411 236 A | 8/2005 |

* cited by examiner

FLOW METER

CROSS-REFERENCE TO RELATED APPLICATIONS

This application claims priority of Great Britain Application No. 0616504.7, filed Aug. 18, 2006, which is hereby incorporated herein in its entirety by reference.

FIELD OF THE INVENTION

The present invention relates to flow meters and in particular to electromagnetic flow meters and the manufacture thereof.

BACKGROUND OF THE INVENTION

Electromagnetic flow meters, and their modes of operation, are well known. In use, an electromagnetic field is generated whose lines of flux are mutually perpendicular to the longitudinal axis of the flow tube through which the fluid to be metered is conducted and to the transverse axis along which the electrodes are located at diametrically opposed positions with respect to the tube. The operating principles are based on Faraday's Law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous values of the voltage established at the electrodes.

Electromagnetic flow metering is a mature and robust technology with the first commercial units being sold over 50 years ago. However, the cost of electromagnetic flow meters is relatively high mainly due to the materials used in their construction and necessarily high labour costs.

Existing commercial electromagnetic flow meters employ two coils positioned on either side of the flow tube in order to try to generate a homogenous magnetic field across the flow tube. Typically bobbin coils wound on suitable pole pieces are used.

BRIEF SUMMARY OF THE INVENTION

The present invention aims to provide at least an alternative type of electromagnetic flow meter which can be made at lower cost than currently available flow meters.

According to one aspect, the present invention provides an electromagnetic flow meter apparatus comprising: i) an inlet for receiving fluid flowing along a flow conduit, ii) an outlet in fluid communication with said inlet for outputting fluid that flows through the flow meter; iii) a measuring section positioned between, and in fluid communication with, said inlet and outlet; iv) a single coil positioned adjacent a portion of said measuring section for generating a magnetic field across said measuring section; and v) electrodes for sensing electric fields generated by fluid flowing through said magnetic field in said measuring section. In one embodiment, the single coil is positioned to surround a portion of the measuring section and/or at least one of said electrodes is offset from being diametrically opposite the other electrode by a predetermined offset angle, to compensate for the use of a single coil. If both electrodes are offset from a centerline of the measuring section, then the offset angles of the electrodes may be the same or different.

In one embodiment the single coil covers a segment of the measuring section having an effective segment angle of between 120 degrees and 180 degrees. The term effective segment angle is used as coils that extend over smaller segment angles can be used with an appropriately shaped pole piece so that it will generate the same (or very similar) magnetic field pattern as a single coil that covers a segment having a segment angle of between 120 degrees and 180 degrees. If the flow meter bore has a width that is less than 65 mm then the single coil is preferably positioned to surround a segment of said measuring section having an effective segment angle of between 160 degrees and 180 degrees. If the flow meter bore has a width of between 65 mm and 600 mm then the single coil is preferably positioned to surround a segment of said measuring section having an effective segment angle of between 140 degrees and 180 degrees.

The electrodes may be positioned at opposite sides of the measuring section. The electrodes may be positioned diametrically opposite each other. The term diametrically opposite is intended to cover the case where the measuring section has a circular cross-section or a non-circular cross-section where the electrodes are positioned on a centerline of the measuring section that passes through the longitudinal axis of the measuring section.

However, in a preferred embodiment one or both of the electrodes are offset from being diametrically opposite each other by an offset angle of between 5 degrees and 45 degrees, measured from the axis of the measuring section. This allows more accurate flow measurements to be obtained when a single coil is used to generate the magnetic field across the measuring section.

In one embodiment the electrodes are offset from being diametrically opposite each other by an offset angle of approximately 10 degrees, measured from the axis of the measuring section, and the single coil covers a segment of said measuring section having a segment angle of approximately 150 degrees.

The inventors have established that a flow meter can be obtained that minimises inaccuracies caused by Reynold's Number effects on the velocity profile by using electrodes that are offset from the centre of the nearest coil bundle by an angle between 20 degrees and 40 degrees.

The electrodes that are used can be point or bar type electrodes, depending on the size of the conduit bore. For small bore flow meters (having a bore diameter of less than 65 mm) point electrodes are preferably used. The electrodes can be contact type electrodes that are designed to contact the fluid being metered or non-contact electrodes that are arranged to sense the electric field capacitively.

The measuring section may have a circular or oval cross-sectional shape in a direction transverse to the flow path or it may have one or more parallel sides defining a square or polygonal cross-section.

In a preferred embodiment the single coil is a saddle shaped coil and extends along the length of the measuring section and is curved around an outer wall of the measuring section. The turns of the saddle shaped coil may enclose a substantially rectangular or diamond shaped area. Alternatively the single coil may be a bobbin coil wound on a pole piece. As mentioned above, pole pieces may also be used with the saddle shaped coil to generate the desired magnetic field pattern.

In one embodiment the flow meter comprises a section of conduit and an elongate insert adapted for longitudinal insertion along and within said section of flow conduit, which insert comprises the above inlet, outlet and measuring section. In this case, the inlet preferably has a restriction that is formed by a transition section between the inlet and measuring section for conditioning the flow before it passes through the measuring section. In a preferred embodiment the cross-sectional shape of the insert in a direction transverse to said flow path transforms smoothly from the shape of the inlet to the shape of the measuring section in the transition section, as this reduces turbulence caused by the restriction.

Typically the flow conduit comprises an outlet that extends away from the flow path for providing power to the coil and for allowing readings to be obtained from the equipment within the flow conduit.

In one embodiment, the cross-sectional area of the measuring section in a direction transverse to the flow path divided by the cross-sectional area of the flow conduit in a direction transverse to the flow path is less than 70%. In one embodiment, the cross-sectional area of the measuring section may cover less than around 50% of the cross-sectional area of the flow conduit. This may be useful in a low flow rate system or to increase the uniformity of the magnetic field in the measuring section.

If desired an electrostatic screen may be provided integrally with or coupled to the insert for providing structural stability to the insert.

Preferably, the insert is manufactured by moulding or extrusion, for example by injection moulding, transfer moulding or rotational moulding. Moulding the flow meter insert, from a material such as a plastics or rubber material may allow non-circular flow meter inserts to be provided that are lightweight and economical but that are strong and robust enough to maintain their integrity under fluid pressure.

In one embodiment, the insert may be manufactured substantially from a thermoplastic material; for example, the insert may be manufactured from a glass-loaded plastics material.

In another embodiment, the insert may be manufactured substantially from a thermoset material.

The insert may be bonded to backpotting, which may be provided to give the insert the strength and rigidity required under fluid pressure. The method of manufacture of the insert is preferably selected based on the material used for the insert and the most suitable method for the particular material selected, which may be a prior art method, may be used.

The invention also provides a method of manufacturing a flow meter comprising: i) providing an inlet for receiving fluid flowing along a flow conduit, ii) providing an outlet in fluid communication with said inlet for outputting fluid that flows through the flow meter; iii) providing a measuring section positioned between, and in fluid communication with, said inlet and outlet; iv) providing a single coil and positioning the single coil adjacent a portion of said measuring section for generating a magnetic field across said measuring section; and v) providing electrodes for sensing electric fields generated by fluid flow through said magnetic field in said measuring section.

Preferably, the insert is back-potted on insertion into a flow conduit. Back-potting may allow the insert to be supported and stabilised within the conduit and hence may increase the reliability of the flow measurements.

A skilled person will appreciate that variations of detail may be provided and features of one aspect may be applied to other aspects within the scope of the invention as set out in the attached claims.

BRIEF DESCRIPTION OF THE SEVERAL VIEWS OF THE DRAWINGS

In order to aid in the understanding of the present invention, a number of exemplary embodiments will now be described in detail, with reference to the accompanying Figures in which.

DETAILED DESCRIPTIONS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiment 1

Figure 1A:
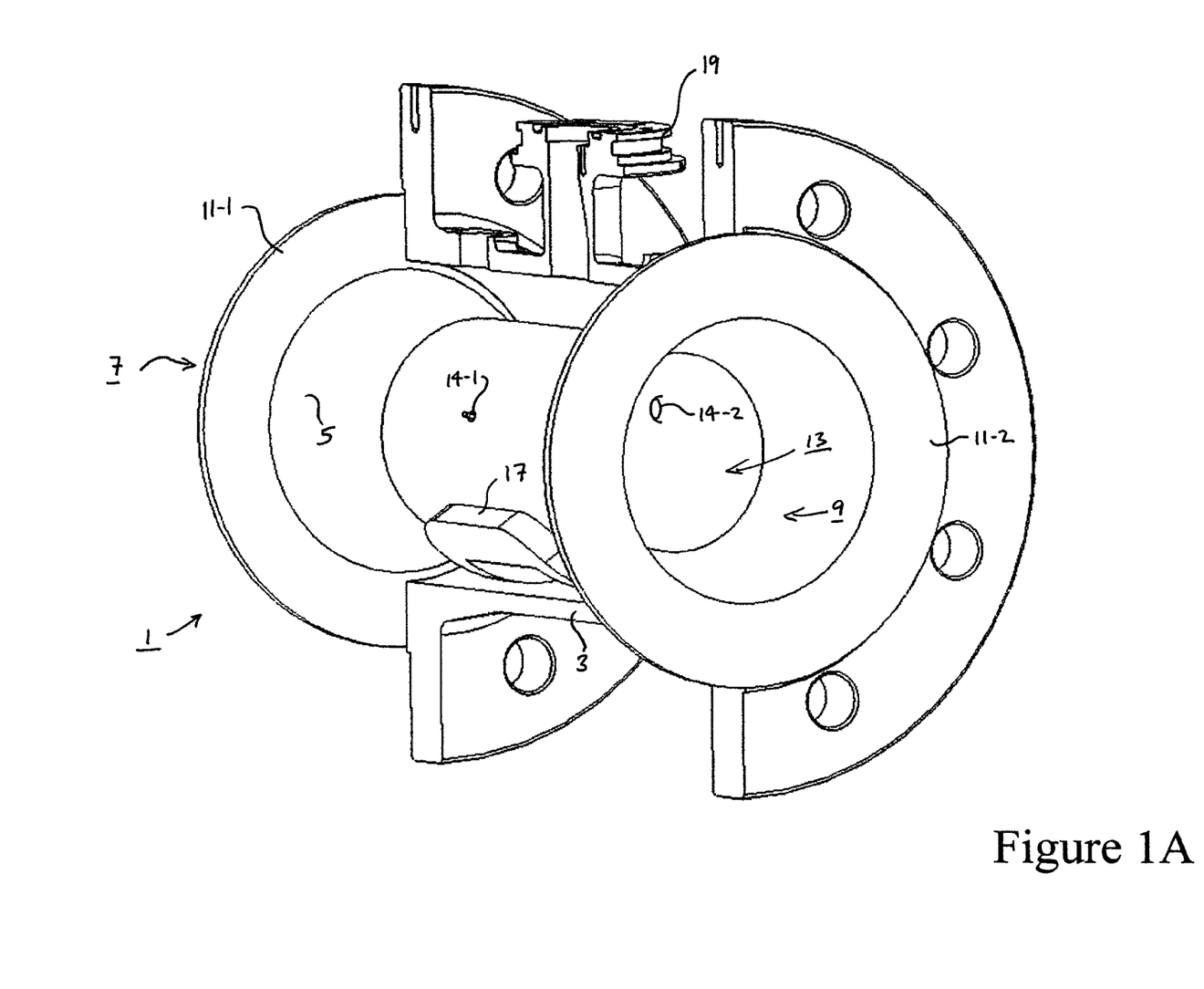
FIG. 1A is a part cut away perspective view of an electromagnetic flow meter embodying the present invention.
Figure 1B:
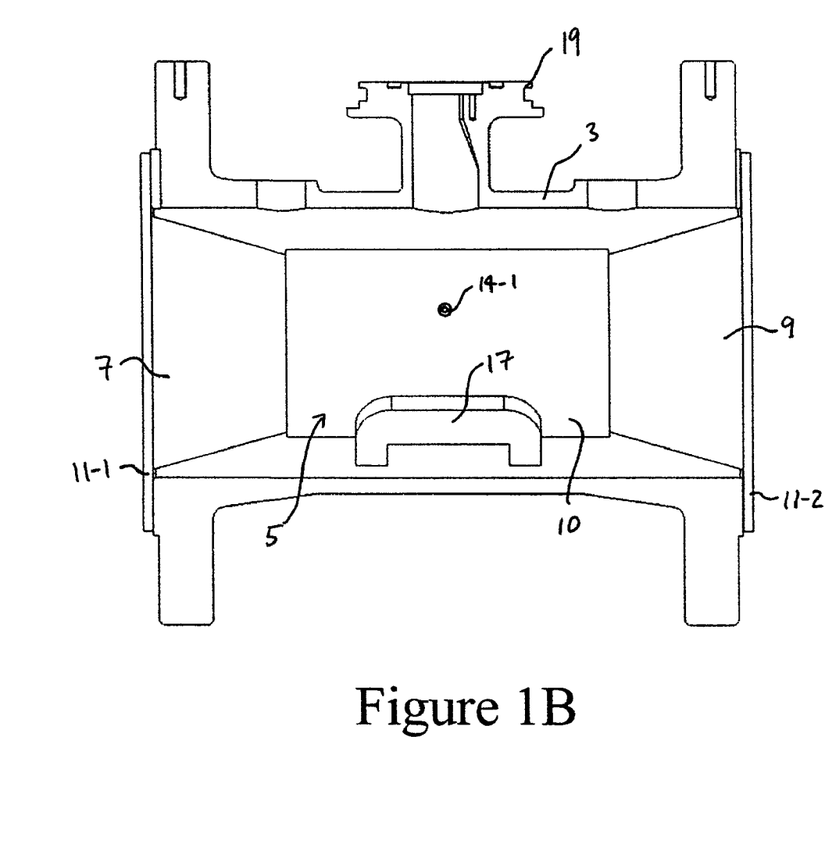
FIG. 1B is a side view of the part cut away electromagnetic flow meter shown in FIG. 1A.
Figure 1C:
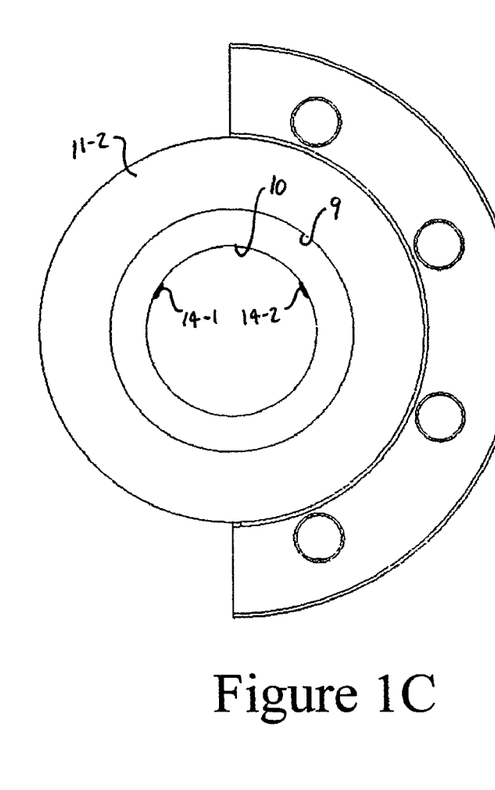
FIG. 1C is a end view of the electromagnetic flow meter shown in FIG. 1A.
Figure 2A:
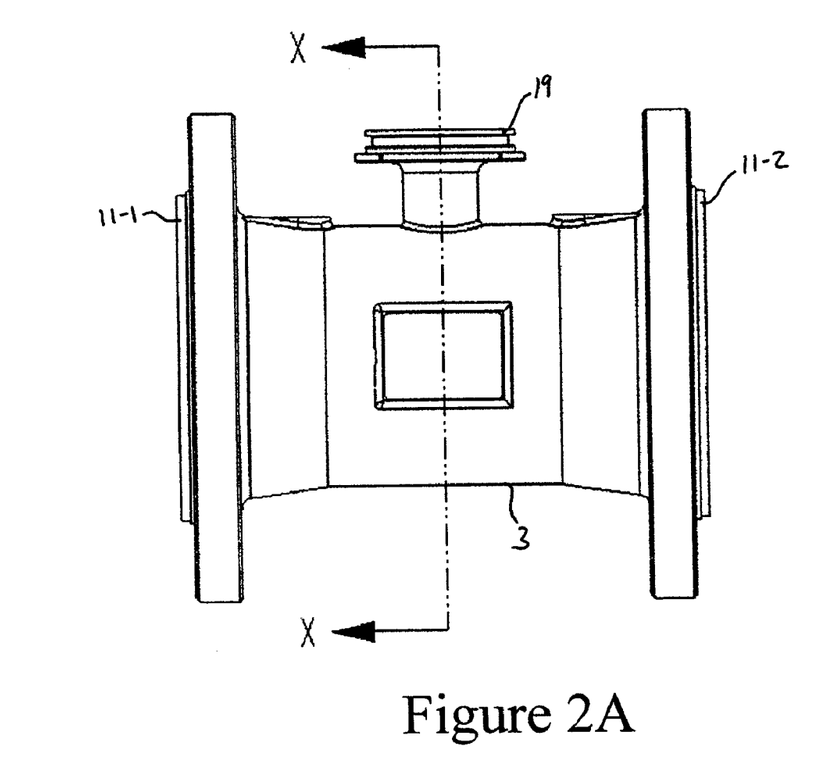
FIGS. 2A and 2B are side and sectional views of the electromagnetic flow meter of FIG. 1A.
Figure 2B:
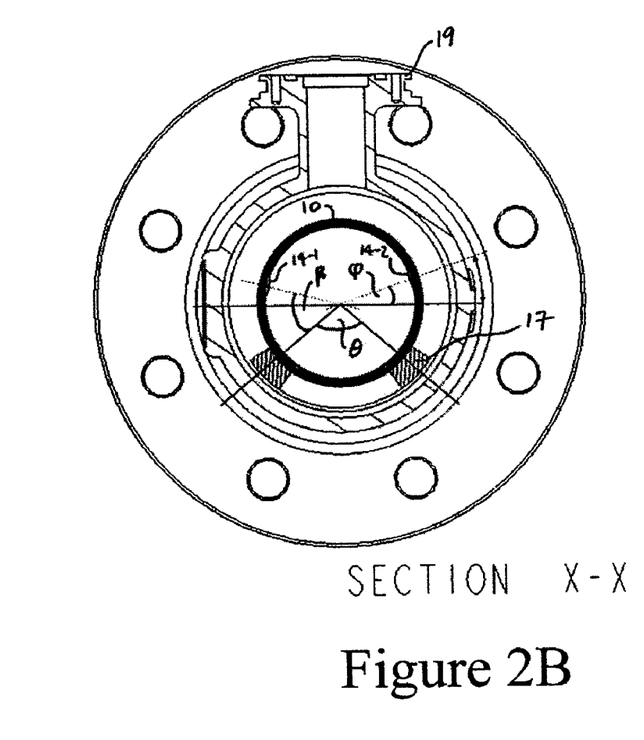

FIGS. 1 and 2 illustrate an electromagnetic flow meter 1 embodying the present invention. The flow meter 1 has a flow conduit 3 (made in this embodiment of Carbon Steel) which is cut in half to illustrate the form of an elongate insert 5 that is longitudinally inserted within the conduit 3. The insert 5 includes an inlet section 7, an outlet section 9 and a central measuring section 10, all of substantially circular cross-section. The dimensions of the inlet 7 and the outlet 9 are such that these sections of the insert 5 just fit within the flow conduit 3. In this embodiment, the insert has flanges 11-1 and 11-2 at each end (one of which may be detachable to facilitate insertion of the insert 5 within the flow conduit 3) that hold the insert securely within the flow conduit 3. The inner walls of the insert 3 define a central bore 13 for the passing of the fluid and means in the form of electrodes 14-1 and 14-2, for detecting electrical potential of the fluid passing through the central bore 13, using known methods, are located in the side wall of the measuring section 10. Small area electrodes 14 are preferably used having a diameter of between 0.1 mm and 20 mm. More or larger electrodes 14 may be used depending on the application of the electromagnetic flow meter, or the diameter of its bore 13. For example, if the central bore 13 is relatively large (e.g. greater than 600 mm) or if the fluid has relatively low conductively, then additional or larger electrodes may be employed.

In this embodiment, a single saddle shaped coil 17 is provided surrounding a lower portion of the measuring section 10. As illustrated more clearly in the cross-sectional view of FIG. 2B, in this embodiment the coil 17 curves around the outer wall of the measuring section 10 over a segment angle (θ) of 150 degrees, which is measured from the central axis of the measuring section 10 to the centres of the coil bundles of the coil 17. The coil 17 also extends along the length of the measuring section 10 over a distance of between 0.1 and 10 times the width of the measuring section 10 in a direction transverse to the flow path.

The inventors have found surprisingly, and contrary to industry standard practice, that the use of a single coil 17 to generate the magnetic field across the measuring section 10 can provide sufficiently accurate flow measurement results. More specifically, for small bore flow meters (where the bore 13 is between 25 mm and 65 mm), the inventors found that good accuracy was obtained when the single coil 17 subtends over a segment angle (θ) of between 160 degrees and 180 degrees; for medium bore flow meters (where the bore 13 is between 65 mm and 600 mm), the inventors found that good accuracy was obtained when the single coil 17 subtends over a segment angle (θ) of between 140 degrees and 180 degrees; and for large bore flow meters (where the bore 13 is greater than 600 mm), the inventors found that good accuracy was obtained when the single coil 17 subtends over a segment angle (θ) of between 120 degrees and 180 degrees.

Additionally, the inventors found that improved accuracy can be achieved by offsetting the positions of one or more of the electrodes 14 so that they are not diametrically opposite each other along a centerline that passes through the longitudinal axis of the measuring section 10 (something that is quite contrary to conventional wisdom). In this embodiment, the electrodes 14 are both offset from the centerline (where they would be diametrically opposite each other) by an offset angle (Φ, shown in FIG. 2B) of 10 degrees. Where both electrodes are offset from the centerline, the offset angles of the electrodes may be the same or they may be different. The inventors have found that an offset angle (Φ) of between 5 degrees and 45 degrees can achieve improved accuracy. The inventors also found that the offset angle (Φ) that minimises inaccuracies caused by Reynold's Number effects on the velocity profile is related to the segment angle (θ) of the coil 17. In particular, in the preferred embodiment, the offset angle (Φ) is chosen so that each electrode is offset from the centre of the nearest coil bundle by an angle (β) between 20 degrees and 40 degrees.

In this embodiment, the flow conduit 3 also has an outlet 19 which may be used to provide power to the single coil 17 within the flow conduit 3 and may be used to allow readings to be obtained from the equipment within the conduit 3.

On insertion into the flow conduit 3, the insert 5 is preferably back-potted to support the insert 5 and stabilise it within the flow conduit 3. Any suitable potting compound may be used, for example epoxy resin or polyurethane.

The flow meter insert 5 may be manufactured by injection moulding. The insert 5 may be manufactured from a plastics material, such as ABS, from natural or synthetic rubber, or from another similar material.

An insert manufactured from materials that are less affected by elevated temperatures or corrosive fluids (such as PTFE, PFA, i.e. 'Teflon' family) may be manufactured from methods already used by these industries (including machining, sintering, Transfer moulding, rotational moulding etc). The methods of manufacture for these materials are slightly different to 'normal' plastics due to the viscoelastic properties of these materials at their processing temperatures. Other more conventional plastics that could be used for less demanding specialist applications such as HDPE or PVDF could be manufactured from more conventional techniques such as injection moulding.

Second Embodiment

Figure 3A:
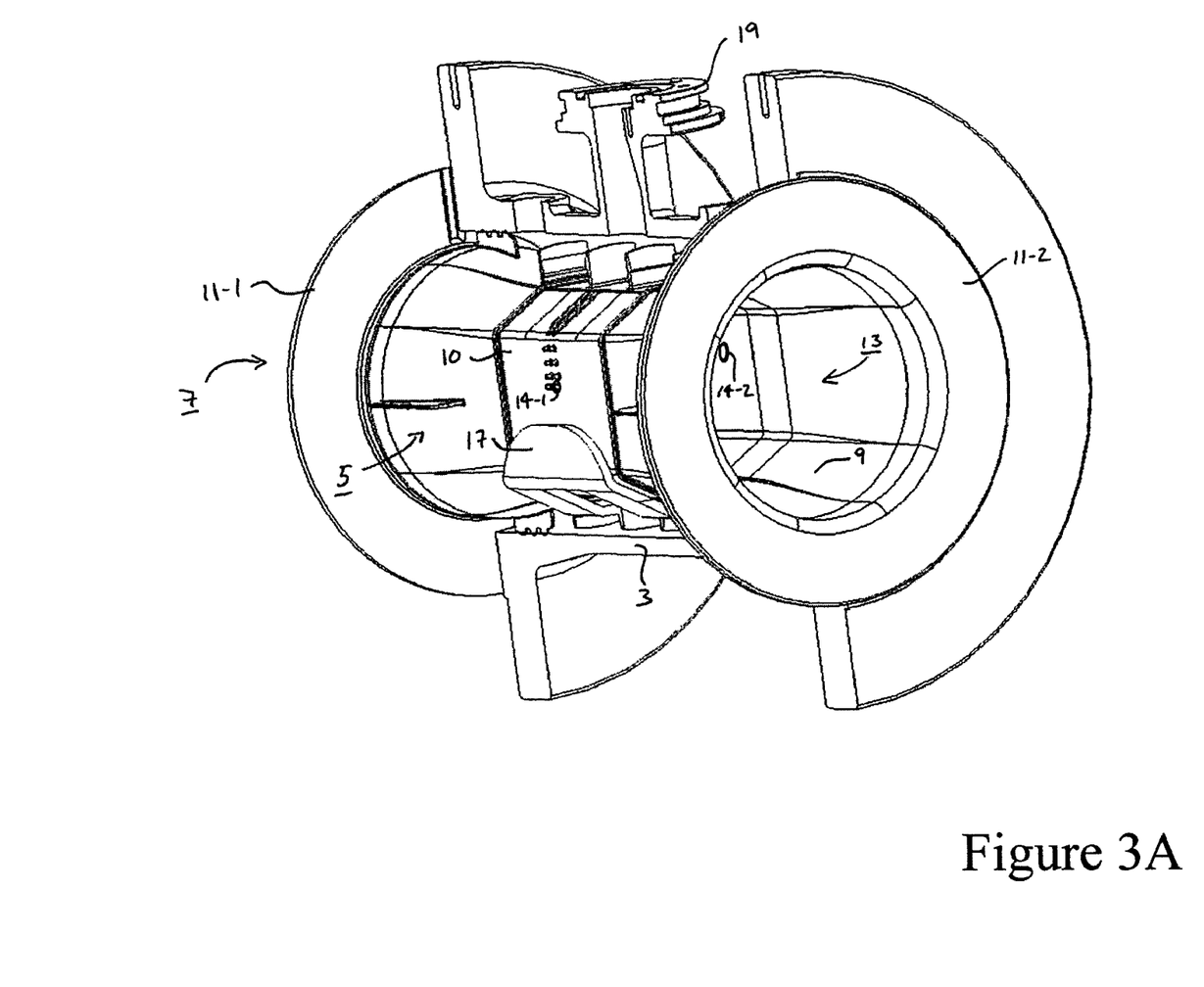
FIG. 3A is a part cut away perspective view of another electromagnetic flow meter embodying the present invention.
Figure 3B:
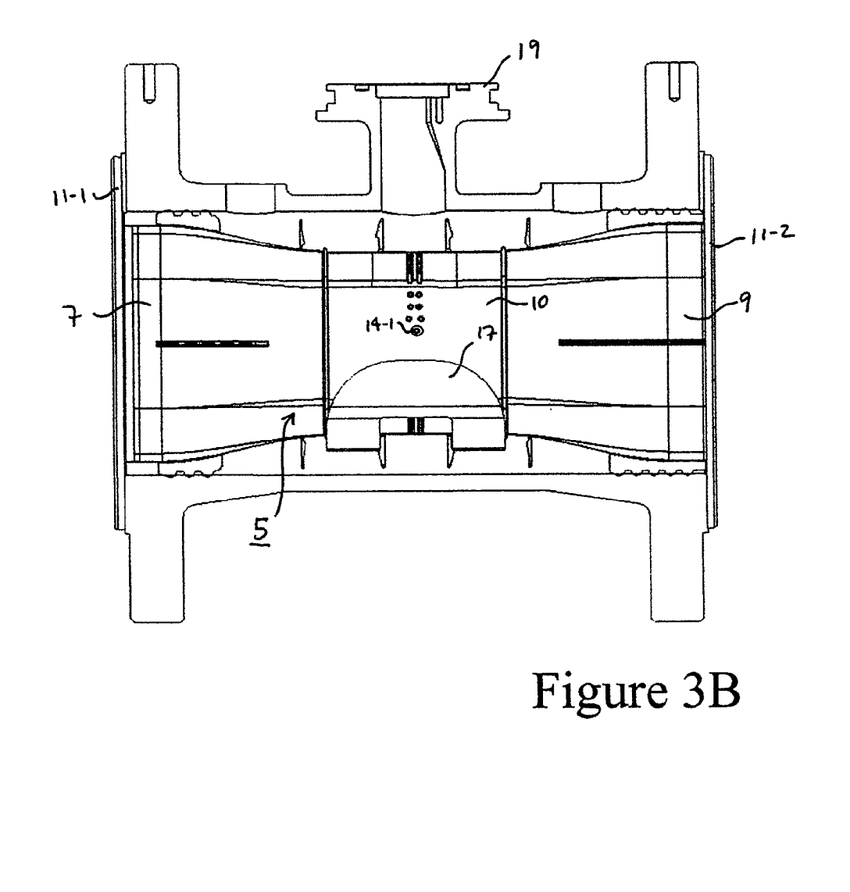
FIG. 3B is a side view of the part cut away electromagnetic flow meter shown in FIG. 3A.
Figure 3C:
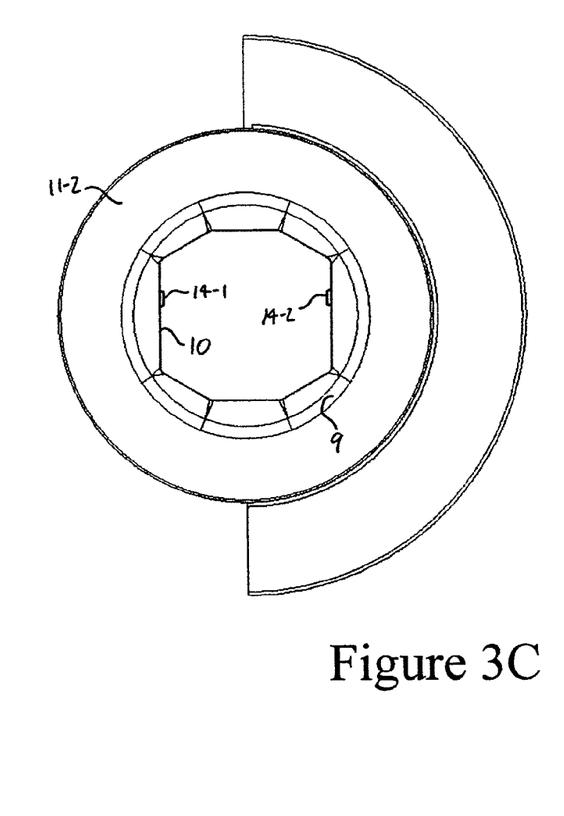
FIG. 3C is an end view of the part cut away electromagnetic flow meter shown in FIG. 3A.

FIGS. 3A, 3B and 3C illustrate an alternative design of electromagnetic flow meter embodying the present invention. In these Figures, the same reference numerals have been used to designate like elements.

The main difference between the flow meter of this embodiment and the flow meter of the first embodiment is that the measuring section 10 has an octagonal cross-section in a direction transverse to the fluid flow. Further, in this embodiment, as illustrated in FIG. 3B, the single coil 17 surrounds a lower segment of the measuring section 10 having a segment angle (θ) of approximately 140 degrees.

In this embodiment, each electrode 14 is offset from the centerline, by an offset angle (Φ) of 20 degrees.

In this embodiment, the insert may be made from any one of: polytetrafluoroethylene (PTFE), ethylene-tetrafluoroethylene (ETFE), polypropylene (PP), polyvinylchloride (PVC), polyethylene terephthalate (PET), acrylonitrile butadiene styrene (ABS), polyethylene (PE), polybutylene terephtalate (PBT), polyoxymethylene (POM), polyphenylene sulphide (PPS) polyetherethere ketone (PEEK), high density polyethylene (HDPE) or polyvinilidene difluoride (PVDF).

Third Embodiment

Figure 4A:
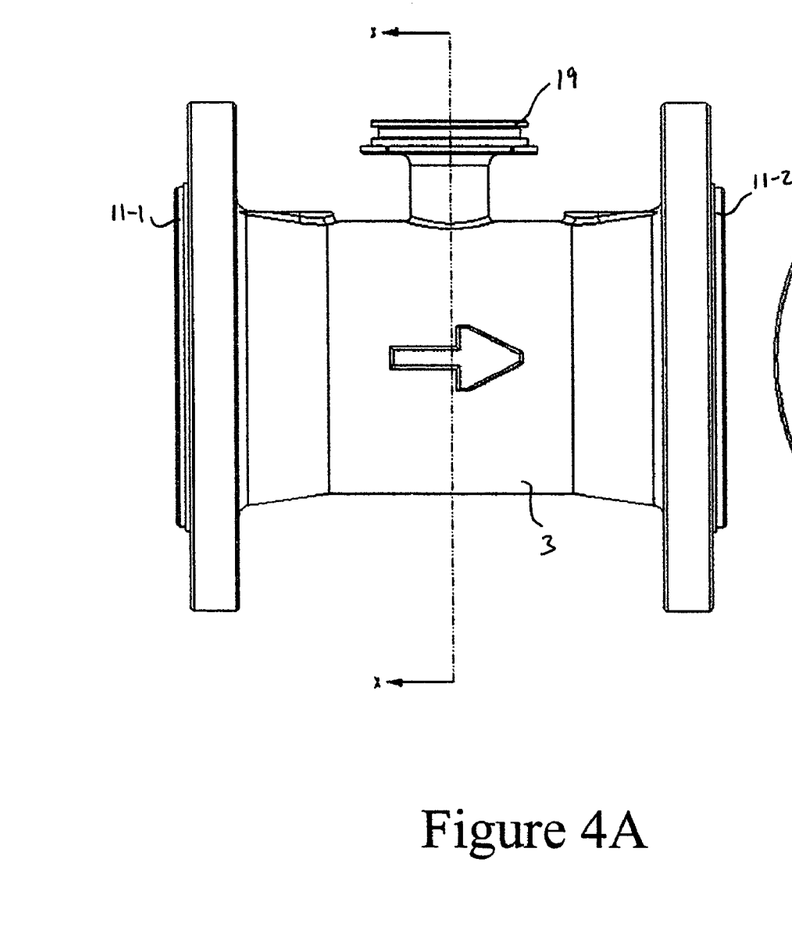
FIGS. 4A and 4B are side and cross-sectional views of a further alternative electromagnetic flow meter embodying the present invention.
Figure 4B:
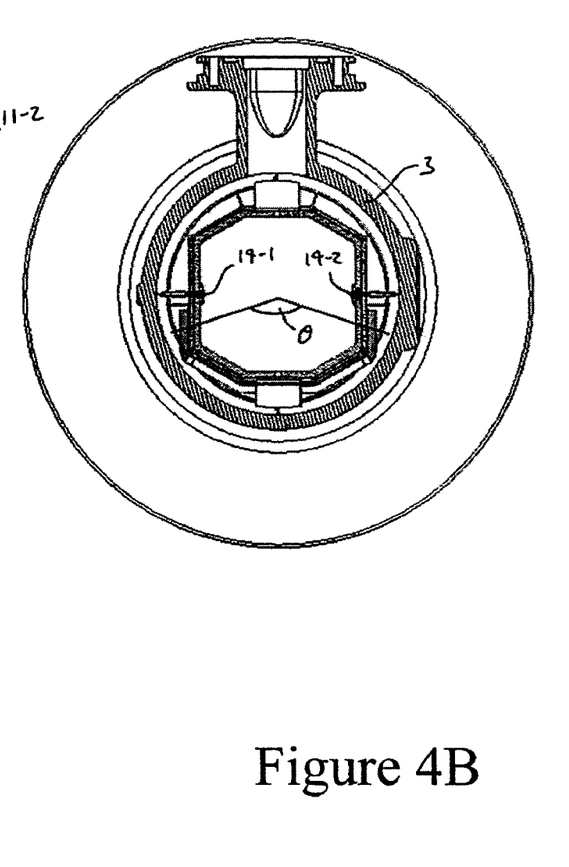

FIGS. 4A and 4B illustrate an alternative design of electromagnetic flow meter embodying the present invention. In these Figures, the same reference numerals have been used to designate like elements. The only difference between the flow meter of this embodiment and the flow meter of the second embodiment is that in this embodiment, the electrodes 14 are not offset from the centerline. Instead, they are positioned to be opposite each other along the centerline that passes through the longitudinal axis of the measuring section 10.

Fourth Embodiment

Figure 5:
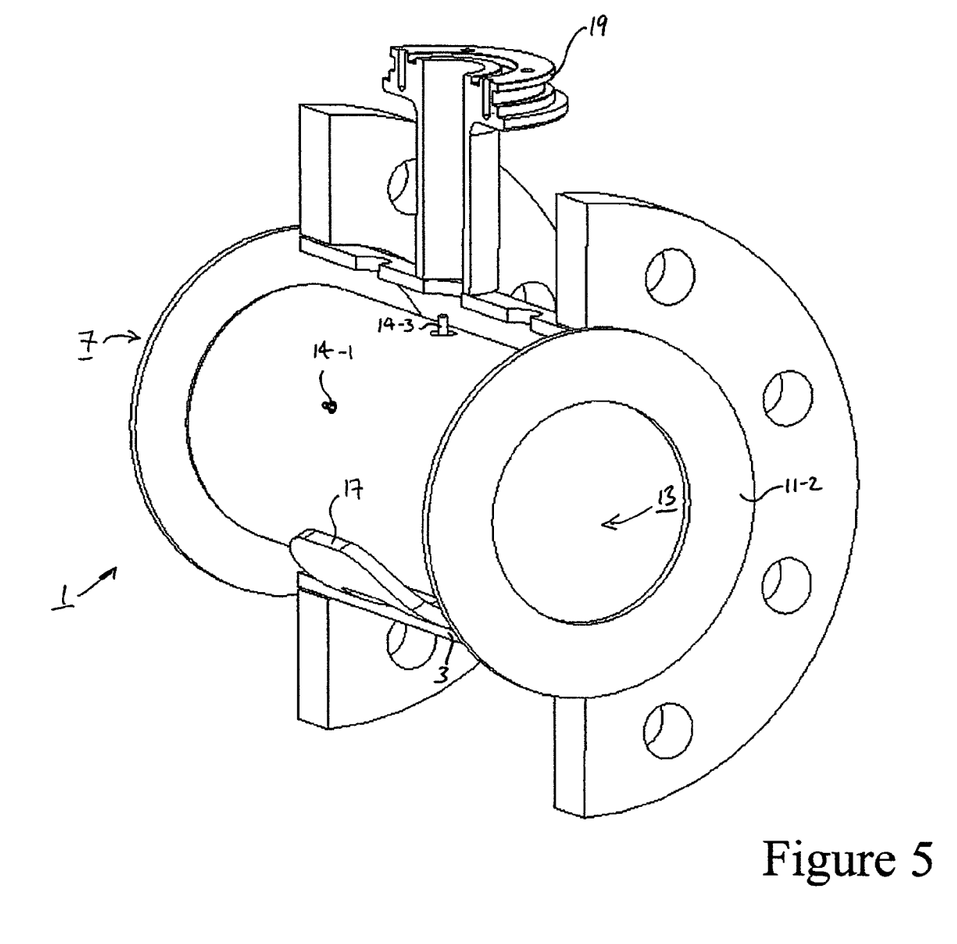
FIG. 5 is a part cut away perspective view of an electromagnetic flow meter embodying the present invention.

FIG. 5 illustrates an alternative design of electromagnetic flow meter embodying the present invention. In this Figure, the same reference numerals have been used to designate like elements. The main difference between the flow meter of this embodiment and the flow meter of the first three embodiments is that in this embodiment the flow meter is a "full bore" type flow meter, where there is no restriction of the fluid flow in the flow meter. In this embodiment, the segment angle (θ) of the coil 17 is 120 degrees and the offset angle (Φ) of each electrode 14 is 25 degrees. In this embodiment a third electrode 14-3 is provided at the top of the flow conduit (opposite the saddle coil 17), and is connected to ground in the conventional way.

Coil Shape and Manufacture

Figure 6A:
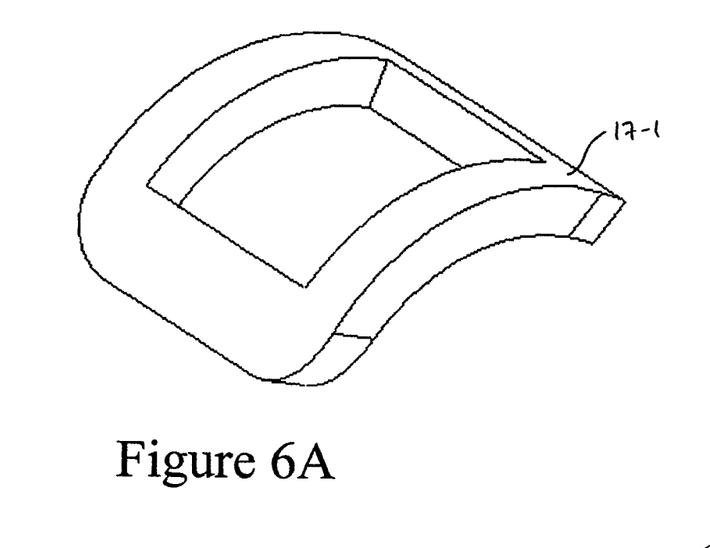
FIG. 6A illustrates in more detail the outline shape of the saddle coil used in the electromagnetic flow meter of FIG. 1.
Figure 6B:
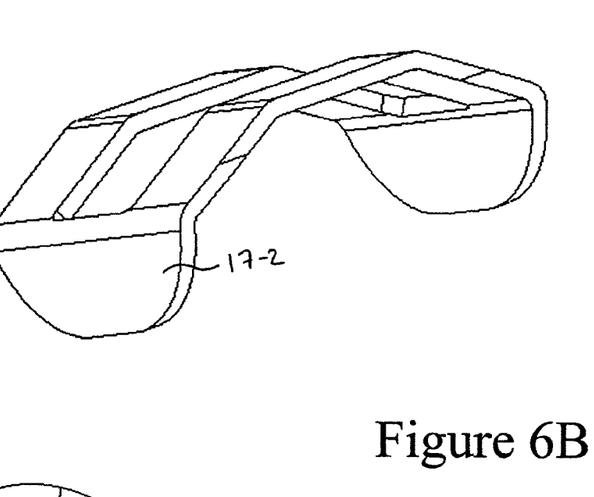
FIG. 6B illustrates in more detail the outline shape of the saddle coil used in the electromagnetic flow meters of FIGS. 3 and 4.
Figure 6C:
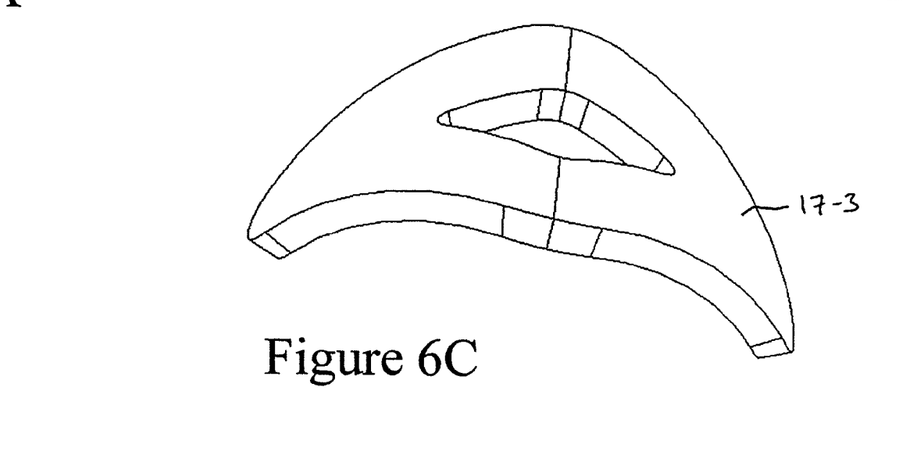
FIG. 6C illustrates in more detail the outline of another saddle shaped coil that can be used in alternative embodiments.

FIG. 6 schematically illustrates the outline shape of a number of saddle coils 17 that can be used in electromagnetic flow meters embodying the present invention. In particular, FIG. 6A illustrates the outline shape of the saddle coil 17-1 used in the first embodiment described with reference to FIGS. 1 and 2; FIG. 6B illustrates the outline shape of the saddle coil 17-2 used in the second and third embodiments described with reference to FIGS. 3 and 4; and FIG. 6C illustrates the outline shape of an alternative "diamond shaped" saddle coil 17-3 that may be used in an alternative electromagnetic flow meter design.

As those skilled in the art will appreciate, the coils illustrated in FIG. 6 are not solid conductors, but are formed from a number of conductor turns (typically 100 or 200 turns) The number of turns, the area enclosed by the turns etc will depend on the diameter (width in a direction transverse to the fluid flow) of the measuring section 10 and hence of the flow conduit 3. Typically, the coil 17 is made by winding the coil to form a flat rectangular coil that is then deformed to have a face that conforms to the shape of the measuring section. The coil may be formed using heat-bonded wire so that it is fixed in the desired shape. Alternatively, the coil 17 may be formed by winding the coil directly over the desired portion of the measuring section 10 and then held in position using clamps or placed within an appropriate forming channel.

A pole piece may also be provided to help produce the required magnetic field pattern. For example, if a coil is required to cover a segment of the measuring section having a segment angle of 140 degrees, then either such a coil can be provided or a coil that covers a smaller segment angle (e.g. 120 degrees) can be used together with a suitably shaped pole piece that curves around the measuring section. The two designs will produce the same or at least very similar magnetic field patterns and are therefore equivalent. In order to cover both of these possibilities, the appended claims refer to the "effective segment angle" of the coil.

Each feature disclosed in this specification (which term includes the claims) and/or shown in the drawings may be incorporated in the invention independently of other disclosed and/or illustrated features.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An electromagnetic flow meter apparatus comprising:
   i) an inlet for receiving fluid flowing along a flow conduit,
   ii) an outlet in fluid communication with said inlet for outputting fluid that flows through the flow meter;
   iii) a measuring section positioned between, and in fluid communication with, said inlet and outlet;
   iv) a single coil positioned adjacent a portion of said measuring section for generating a magnetic field across said measuring section; and
   v) electrodes for sensing electric fields generated by fluid flowing through said magnetic field in said measuring section;
   wherein said single coil is positioned to surround a portion of said measuring section and wherein said electrodes are circumferentially offset from being diametrically opposite each other.

2. A flow meter according to claim 1, wherein said single coil is positioned to surround a segment of said measuring section to have an effective segment angle of between 120 degrees and 180 degrees.

3. A flow meter according to claim 2, wherein said measuring section has a width that is greater than 600 mm.

4. A flow meter according to claim 2, wherein said measuring section has a width of less than 65 mm and wherein said single coil is positioned to surround a segment of said measuring section to have an effective segment angle of between 160 degrees and 180 degrees.

5. A flow meter according to claim 2, wherein said measuring section has a width of between 65 mm and 600 mm and wherein said single coil is positioned to surround a segment of said measuring section to have an effective segment angle of between 140 degrees and 180 degrees.

6. A flow meter according to claim 2, wherein said single coil is positioned to surround a segment of said measuring section having a segment angle outside said range of angles and further comprising a pole piece that causes said coil to have similar magnetic characteristics to a coil that is positioned to surround a segment of said measuring section that has a segment angle within said range of angles.

7. A flow meter according to claim 6, where each electrode is offset from a centreline of the measuring section by a respective offset angle.

8. A flow meter according to claim 7, where each offset angle is between 5 degrees and 45 degrees, measured from the axis of the measuring section.

9. A flow meter according to claim 8, wherein said single coil is positioned to surround a segment of said measuring section and wherein each electrode is offset from the centre of the nearest coil bundle by an angle of between 20 degrees and 40 degrees.

10. A flow meter according to claim 1, wherein said coil extends along said measuring section over a distance of between 0.1 and 10 times the width of the measuring section.

11. A flow meter according to claim 1, wherein said electrodes are positioned at opposite sides of the measuring section.

12. A flow meter according to claim 1, wherein said electrodes have a 0.1 mm to 20 mm diameter and act as point electrodes.

13. A flow meter according to claim 1, wherein said electrodes are bar electrodes that extend over a section of the measuring section's wall.

14. A flow meter according to claim 1, wherein said measuring section has a circular cross-sectional shape.

15. A flow meter according to claim 1, wherein said measuring section has a non-circular cross-sectional shape.

16. A flow meter according to claim 1, wherein said measuring section has a width, in a direction transverse to a direction of fluid flow through the measuring section, that is greater than 600 mm.

17. A flow meter according to claim 1, wherein said single coil is a saddle shaped coil that extends along the length of the measuring section and that is positioned to surround a portion of the measuring section.

18. A flow meter according to claim 1, wherein said single coil comprises a bobin coil and a pole piece.

19. A flow meter according to claim 1, comprising a section of conduit and an elongate insert adapted for longitudinal insertion along and within said section of flow conduit, said insert comprising said inlet, outlet and said measuring section.

20. A flow meter according to claim 19 wherein said inlet has a restriction that is formed by a transition section between the inlet and measuring section, wherein the cross-sectional shape of the insert in a direction transverse to said flow path transforms smoothly from the shape of the inlet to the shape of the measuring section in the transition section.

21. A flow meter according to claim 19 wherein the cross-sectional area of the measuring section in a direction transverse to said flow path divided by the cross-sectional area of the flow conduit in a direction transverse to said flow path is less than 70%.

22. A flow meter according to claim 19 wherein the insert is manufactured substantially from a thermoset or a thermoplastic material.

23. A flow meter according to claim 19 wherein the insert comprises a detachable flange for retaining the insert in the flow conduit.

24. A flow meter according to claim 19 wherein the flow conduit comprises an outlet that extends away from the flow path for providing power to the coil and for allowing readings to be obtained from equipment within the flow conduit.

25. A flow meter according to claim 1, wherein said inlet comprises a restriction for conditioning the fluid flow through said measuring section.

26. A flow meter according to claim 1, wherein the electrodes are arranged, in use, to contact the fluid flowing through said measuring section.

27. A flow meter according to claim 1, wherein the electrodes are arranged, in use, to capacitively sense the electric field generated across said measuring section by said fluid flow.

28. A method of manufacturing a flow meter comprising:
  i) providing an inlet for receiving fluid flowing along a flow conduit;
  ii) providing an outlet in fluid communication with said inlet for outputting fluid that flows through the flow meter;
  iii) providing a measuring section positioned between, and in fluid communication with, said inlet and outlet;
  iv) providing a single coil and positioning the single coil adjacent said measuring section for generating a magnetic field across said measuring section;
  v) providing electrodes for sensing electric fields generated by fluid flow through said magnetic field in said measuring section; and
  wherein said positioning said single coil positions the single coil to surround a portion of said measuring section and wherein said providing electrodes provides electrodes that are circumferentially offset from being diametrically opposite each other.

29. A method according to claim 28, wherein said providing a single coil provides a single coil that is positioned to surround a segment of said measuring section to have an effective segment angle of between 120 degrees and 180 degrees.

30. A method according to claim 29, wherein said providing a measuring section provides a measuring section that has a width greater than 600 mm.

31. A method according to claim 29, wherein said providing a measuring section provides a measuring section that has a width that is less than 65 mm and wherein said providing a single coil provides a single coil that is positioned to surround a segment of said measuring section to have an effective segment angle of between 160 degrees and 180 degrees.

32. A method according to claim 29, wherein said providing a measuring section provides a measuring section that has a width of between 65 mm and 600 mm and wherein said providing a single coil provides a single coil that is positioned to surround a segment of said measuring section to have an effective segment angle of between 140 degrees and 180 degrees.

33. A method according to claim 29, wherein said providing a coil provides a single coil that is positioned to surround a segment of said measuring section having a segment angle outside the range of angles and further comprising a pole piece that causes said coil to have similar magnetic characteristics to a coil that is positioned to surround a segment of said measuring section that has a segment angle within the range of angles.

34. A method according to claim 28, wherein said providing a single coil provides a single coil that extends along said measuring section over a distance of between 0.1 and 10 times the width of the measuring section.

35. A method according to claim 28, wherein said providing said electrodes provides electrodes that are positioned at opposite sides of the measuring section.

36. A method according to claim 28, wherein said providing electrodes provides electrodes that are each offset from a centreline of the measuring section by a respective offset angle.

37. A method according to claim 36, wherein said providing said electrodes provides electrodes such that each offset angle is between 5 degrees and 45 degrees, measured from the axis of the measuring section.

38. A method according to claim 37, wherein said providing said electrodes provides electrodes that are offset from being diametrically opposite each other by an offset angle of approximately 10 degrees, measured from the axis of the measuring section, and wherein said single coil is positioned to surround a segment of said measuring section having a segment angle of approximately 150 degrees.

39. A method according to claim 37, wherein said providing a single coil provides a single coil that is positioned to surround a segment of said measuring section and said providing electrodes provides electrodes that are offset from the centre of the nearest coil bundle by between 20 degrees and 40 degrees.

40. A method according to claim 28, wherein said providing said electrodes provides electrodes that have a 0.1 mm to 20 mm diameter and act as point electrodes.

41. A method according to claim 28, wherein said providing said electrodes provides bar electrodes that extend over a section of the measuring section's wall.

42. A method according to claim 28, wherein said providing a measuring section provides a measuring section that has a circular cross-sectional shape.

43. A method according to claim 28, wherein said providing a measuring section provides a measuring section that has a non-circular cross-sectional shape.

44. A method according to claim 28, wherein said providing a coil provides a single saddle shaped coil that extends along the length of the measuring section and that is curved around an outer wall of the measuring section.

45. A method according to claim 28, wherein said providing a coil provides a single coil that is a bobbin coil wound on a pole piece.

46. A method according to claim 28, comprising providing a section of conduit and an elongate insert comprising said inlet, outlet and said measuring section, and longitudinally inserting said insert along and within said section of flow conduit.

47. A method according to claim 28, comprising providing an inlet that comprises a restriction for conditioning the fluid flow through said measuring section.

48. A method according to claim 28, wherein the cross-sectional area of the measuring section in a direction transverse to said flow path divided by the cross-sectional area of the flow conduit in a direction transverse to said flow path is less than 70%.

49. A method according to claim 28, wherein providing said electrodes provides electrodes that are arranged to contact the fluid flowing through said measuring section.

50. A method according to claim 28, wherein providing said electrodes provides electrodes that are arranged to capacitively sense the electric field generated across said measuring section by said fluid flow.

* * * * *